United States Patent
Carlini, Jr.

[11] Patent Number: 6,127,937
[45] Date of Patent: Oct. 3, 2000

[54] SYSTEM AND METHOD FOR MONITORING ENVIRONMENTAL CONDITIONS INSIDE A GRANULATED PILE

[75] Inventor: Archimedo M. Carlini, Jr., Winter Haven, Fla.

[73] Assignee: ARR-MAZ Products, L.P., Winter Haven, Fla.

[21] Appl. No.: 09/307,632

[22] Filed: May 7, 1999

[51] Int. Cl.[7] ................................................ G08B 23/00
[52] U.S. Cl. ........................ 340/693.5; 73/73; 340/539
[58] Field of Search .............................. 340/693.5, 602, 340/604, 533, 539; 73/73

[56] References Cited

U.S. PATENT DOCUMENTS

| | | | |
|---|---|---|---|
| 2,834,201 | 5/1958 | Ohlheiser | 73/73 |
| 3,459,925 | 8/1969 | Goosey et al. | 376/207 |
| 3,938,385 | 2/1976 | Horwath | 374/137 |
| 3,982,110 | 9/1976 | Kawai | 374/167 X |
| 4,044,607 | 8/1977 | Deal | 73/73 |
| 4,114,442 | 9/1978 | Pratt | 374/113 |
| 4,176,554 | 12/1979 | Kazmierowicz | 374/137 |
| 4,324,138 | 4/1982 | Davis et al. | 374/111 |
| 4,399,404 | 8/1983 | Resh | 73/73 X |
| 4,408,904 | 10/1983 | Tokarz | 374/137 |
| 4,412,090 | 10/1983 | Kawate et al. | 374/137 X |
| 4,445,788 | 5/1984 | Twersky et al. | 374/142 |
| 4,483,631 | 11/1984 | Kydd | 374/141 |
| 4,553,432 | 11/1985 | Barlian et al. | 374/142 |
| 4,567,563 | 1/1986 | Hirsch | 73/73 X |
| 4,707,148 | 11/1987 | Richmond | 374/208 |
| 4,738,142 | 4/1988 | Morgan | 73/864.64 |
| 4,845,978 | 7/1989 | Whitford | 73/73 |
| 4,866,997 | 9/1989 | Kaufman | 73/864.63 |
| 4,923,333 | 5/1990 | Timmons | 73/73 X |
| 5,025,248 | 6/1991 | Bergeron | 340/596 |
| 5,217,306 | 6/1993 | Wada | 374/161 |

*Primary Examiner*—Thomas Mullen
*Attorney, Agent, or Firm*—Dennis G. LaPointe; Mason & Associates, PA

[57] ABSTRACT

System and method for monitoring of environmental conditions, such as temperature, humidity and pressure, inside a granulated material pile, particularly piles of fertilizer, at production and storage sites. Environmental condition detectors in a plurality of first housing segments are spaced apart within the pile by intermediate elongate second housing segments to form an elongate columnar housing which extends within the pile. Data can be transmitted through electrical cables or by radio frequency transmitted data. The conditions at various levels adjacent each first housing segment can be monitored and correlated with the aging of the pile until the pile reaches grade. The data may be displayed and processed to correlate and profile the data for signs of pile set.

21 Claims, 7 Drawing Sheets

SYSTEM AND METHOD FOR MONITORING ENVIRONMENTAL CONDITIONS INSIDE A GRANULATED PILE

BACKGROUND OF THE INVENTION

1. Field of the Invention

The invention relates to a system and method for monitoring environmental conditions, such as temperature and humidity, inside granulated piles, at production and storage sites. Even though the present invention relates primarily to use in granulated fertilizer piles, it is not limited to such use.

2. Description of Related Art

Temperature and humidity monitoring systems are known in the art. However, in the phosphate fertilizer industry, samples from granulated phosphate fertilizer piles containing Granulated Triple Super-Phosphate (GTSP), Mono-Ammonium Phosphate (MAP), or Di-Ammonium Phosphate (DAP) may have to be sent to a lab after a moisture related problem occurs, to determine corrective dust control measures and measures to overcome humidity problems associated with the locations where the piles are located. For example, changes in the granulation process may be required, including modifying the dust control measures. A problem associated with the current practice, is that there is uncertainty and delay in assessing when a pile is ready to load, that is aged, or which pile might show signs of pile set. A pile is aged when a soluble phosphate level in the pile reaches 46 percent. Should a pile set, that is, cease its aging process, a significant amount of production and loading time is lost.

Humidity can cause significant caking of the piles of granulated fertilizer on ships, in warehouses and in mines. A cap is formed on the top of the pile ranging from 2 inches thick to about 2 feet thick. The cap turns white and poses significant dust problems. Should a fertilizer pile cake up, in order to unload or load the pile, blasting sometimes has to be resorted to, subjecting companies to liability for property damage or injury to personnel.

Known related art includes a soil profile probe depicted in U.S. Pat. No. 4,445,788 to Twersky et al., a temperature and humidity surveillance system for use in steam power plants depicted in U.S. Pat. No. 4,553,432 to Barlian et al., and a humidity monitoring system for grain silos depicted in U.S. Pat. No. 2,834,201 to Ohlheiser.

Other known related art include U.S. Pat. No. 3,459,925 to Goosey et al., U.S. Pat. No. 3,938,385 to Horwath, U.S. Pat. No. 3,982,110 to Kawai, U.S. Pat. No. 4,114,442 to Pratt, U.S. Pat. No. 4,176,554 to Kazmierowicz, U.S. Pat. No. 4,324,138 to Davis et al., U.S. Pat. No. 4,408,904 to Tokarz, U.S. Pat. No. 4,412,090 to Kawate et al., U.S. Pat. No. 4,707,148 to Richmond, U.S. Pat. No. 4,483,631 to Kydd, U.S. Pat. No. 5,025,248 to Bergeron, and U.S. Pat. No. 5,217,306 to Wada.

None of the devices in the above references solve the problem of providing on-site field data and correlation of the temperature and humidity or other environmental conditions, such as pressure, inside phosphate fertilizer piles or similar granulated pile materials at specific production sites such as in mines, in warehouses or in ships such that operators can monitor the aging of the pile until it reaches grade, generally 46 percent soluble phosphate level, or such that operators can take timely measures to change the granulation process, if necessary, and/or to evaluate the effects of dust control measures or to provide additional dust control measures. An object of the present invention would provide an easily assembled or preassembled environmental condition monitoring system and method of use such that the part of the system housing the detectors can be readily placed in a pile of granulated fertilizer in a desired or predetermined orientation within the pile. The invention would provide on-site field data by monitoring and evaluating parameters, such as temperature and humidity, inside a pile of granulated fertilizer such that the effects of dust control measures can be evaluated and changes in the granulation process can be considered based on the environmental conditions within the pile as the pile is aging until it reaches grade, thereby saving production costs.

SUMMARY OF THE INVENTION

The present invention is a system for monitoring environmental conditions at locations inside a pile of granulated material. Although the present invention was developed primarily for use in phosphate fertilizer piles, it can be applied to other granulated material piles. The present invention comprises a plurality of ambient environmental condition detecting means, an elongate columnar housing including a plurality of first housing segments, also referred to herein as sampler chambers, for inserting each of said ambient environmental condition detecting means and a plurality of second housing segments, each intermediate each of said first housing segments for spacing each first housing segment a predetermined spaced apart distance from each other. Each first housing segment has means for open communication between a hollow interior ambient environmental condition in each first housing segment and a pile environmental condition at a predetermined location within the pile wherein the ambient environmental condition detecting means within each first housing segment detects said pile environmental condition adjacent said first housing segment. The invention further includes means for remotely displaying and monitoring the environmental conditions detected within each first housing segment, and means for electrically interconnecting each detecting means within the plurality of first housing segments and the display means, wherein the system is capable of monitoring and profiling the environmental condition at each predetermined location within the pile adjacent each first housing segment.

The invention is adapted such that it can be oriented in any predetermined or desired orientation within a pile of granulated fertilizer. The invention includes interconnecting electrical cables which allow for remote monitoring of the environmental parameters or conditions by the use of a display monitor or other means known in the art.

In conjunction with the display means or by itself, a processor means is preferably remotely added to the system for evaluating, correlating and profiling the data corresponding to the environmental conditions monitored within the pile adjacent each first housing segment. The monitoring, correlation and profiling can continue with the aging of the pile until the pile reaches grade or to provide notice of pile set. An advantage to the system use in the field is the providing of on-site data in environments where increased humidity can cause caking and costly corrective measures such as blasting to allow for loading and unloading into and out of railcars, ships, warehouses, etc. Field monitoring can also provide insight on required changes in the granulation process or in additional dust control measures.

The present invention therefore provides a simple field usable system and method for monitoring the aging of piles of granulated fertilizer in such a manner that timely corrective measures can be taken that will lower production costs due to more efficient and faster loading and unloading, as well as minimizing the need for blasting and resultant exposure to liability.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Figure 1:
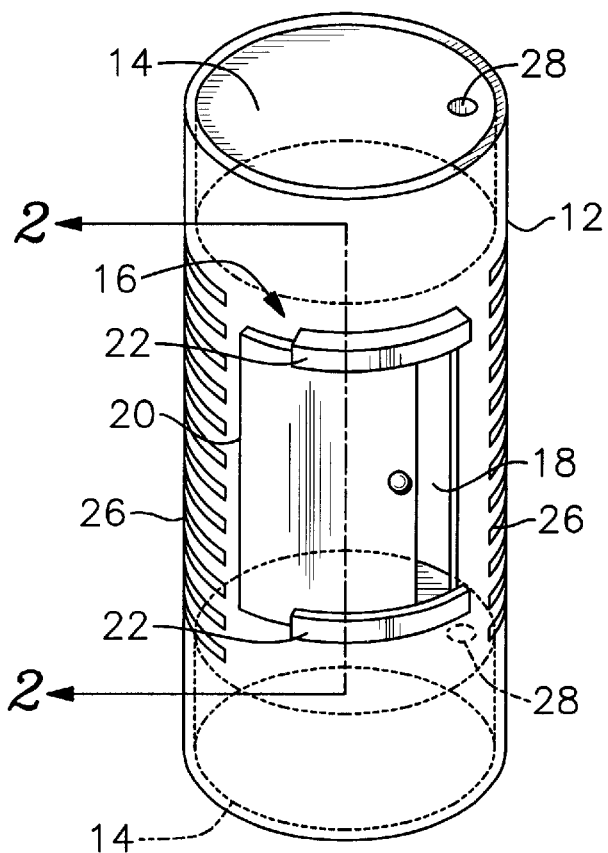
FIG. 1 is a perspective view of a first housing segment portion of the system.
Figure 2:
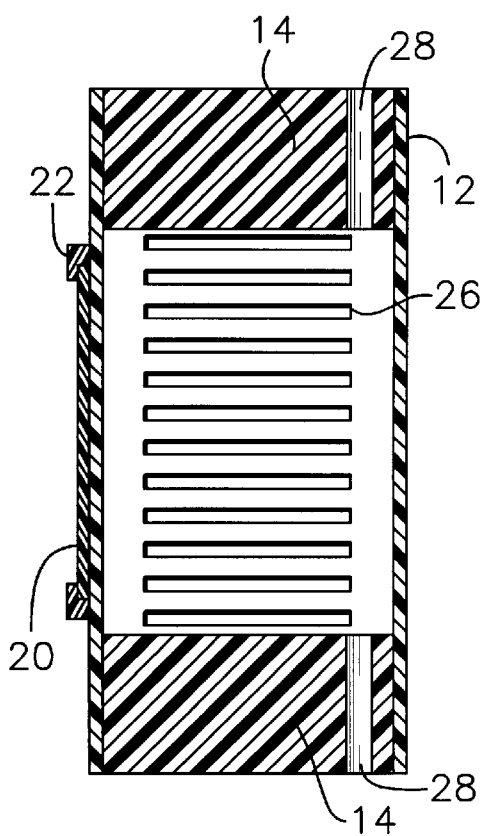
FIG. 2 is a cross-sectional view of the first housing segment of FIG. 1.
Figure 4:
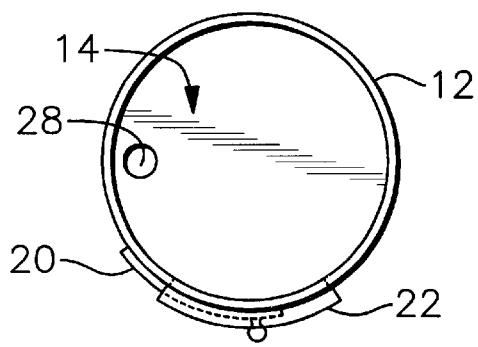
FIG. 4 is a plan view of the device depicted in FIG. 1.

Referring now to the drawings, in particular FIGS. 1 through 5, the invention which is depicted generally as 10, is a system for monitoring environmental conditions inside a pile of granulated material 46, such as phosphate fertilizer, which comprises a plurality of hollow elongate columnar first housing segments 12, each first housing segment 12 being adapted to house means for detecting environmental conditions 34 inside said first housing segment 12. Each first housing segment 12 has means 14 for plugging opposing open ends of each first housing segment 12. Each plug means 14 has cable download means 28 for running electrical cable 38 for the means for detecting environmental conditions 34 through the system 10.

Each first housing segment 12 has at least one column of a plurality of horizontal elongate slits 26 for open communication of an environmental condition in the granulated pile 60 adjacent a first housing segment 12 location within the pile 46, each of the plurality of slits 26 being a predetermined length and distance apart. The column of slits 26 generally extends between opposing ends of each elongate first housing segment 12. Each slit is typically approximately 0.010 inches wide and about 1½–2 inches long. Each first housing segment 12 further includes access means 16 for inserting the means for detecting environmental conditions 34 inside said first housing segment 12 and for connecting said electrical cable 38 to said means for detecting environmental conditions 34, the access means 16 being adapted to be opened (see opening 18 which is typically about 6 inches high by 3 inches wide) for inserting and connecting the detecting means 34 and to be closed (see door 20) for use in the granulated pile 46.

The system 10 further includes a plurality of hollow elongate second housing segments 32, each second housing segment 32 being a predetermined length and adapted to be intermediate to and for interconnecting each elongate first housing segment 12 and for running a plurality of interconnecting electrical cables 38 between each first housing segment 12. First housing segment 12 and intermediate second housing segments 32 are typically made from 4 inch PVC Schedule 40 or Schedule 80 pipe material although other columnar shaped material can be used such as square tubing. The segments 12 and 32 are typically assembled with coupling means 30 such as standard PVC fittings. First housing segments 12 are plugged at opposing ends with plug means 14 such as standard PVC plugs either cemented, threaded within each segment 12 or pressure fitted within each segment 12. The first housing segments 12 are typically about 12 inches long and the intermediate second housing segments 32 typically separate each first housing segment 12 about 5 feet apart.

The system 10 further includes means for remotely displaying 48 the environmental conditions 58 inside each first housing segment 12, the electrical cables 38 from each means for detecting 34 environmental conditions being connected to said display means 48, wherein the system 10 monitors the environmental conditions 60 within the pile 46 at each first housing segment 12 location in the pile 46.

Each first housing segment 12 optionally has two columns of a plurality of horizontal elongate slits 26, each column being radially spaced a predetermined angle apart, generally about 180° apart. The cable download means 28 in the plug means 14 is typically an aperture in the plug means 14 adapted to include a cable wire way bushing 52 for sealing the electrical cables 38 passing through said aperture.

Figure 3:
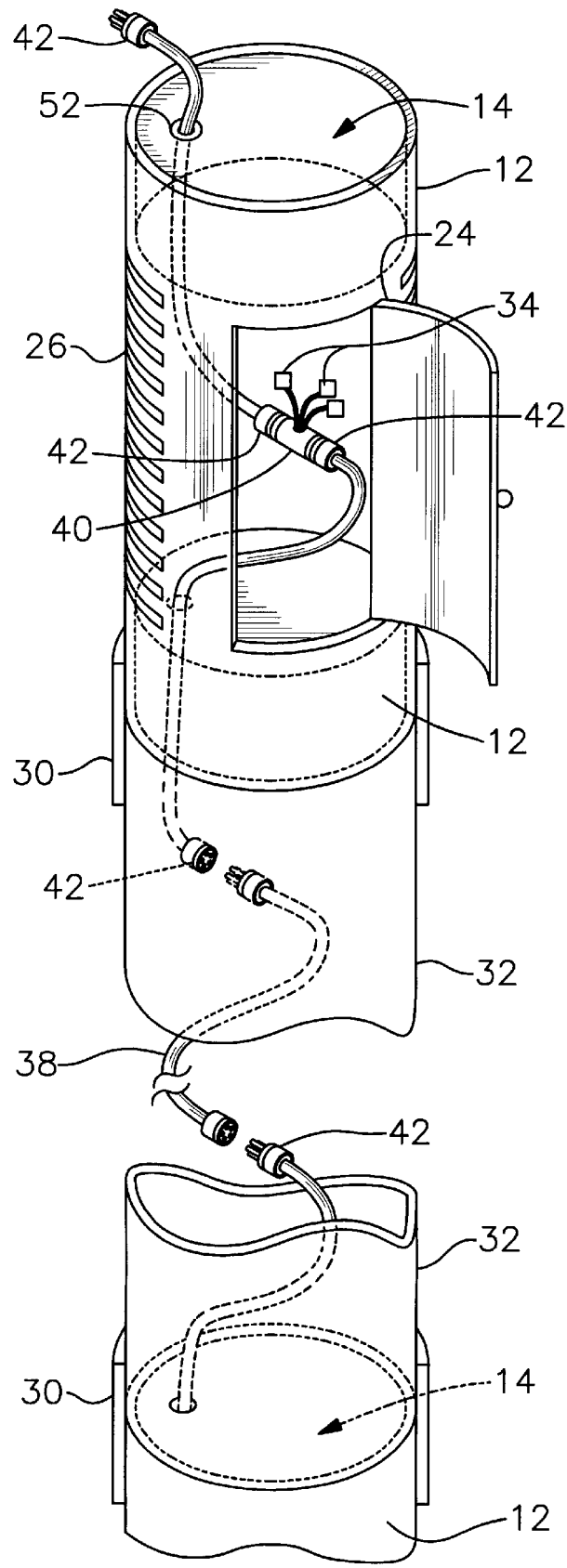
FIG. 3 is a perspective view of a portion of the system depicting the first housing segment connected to an intermediate second housing segment.
Figure 5:
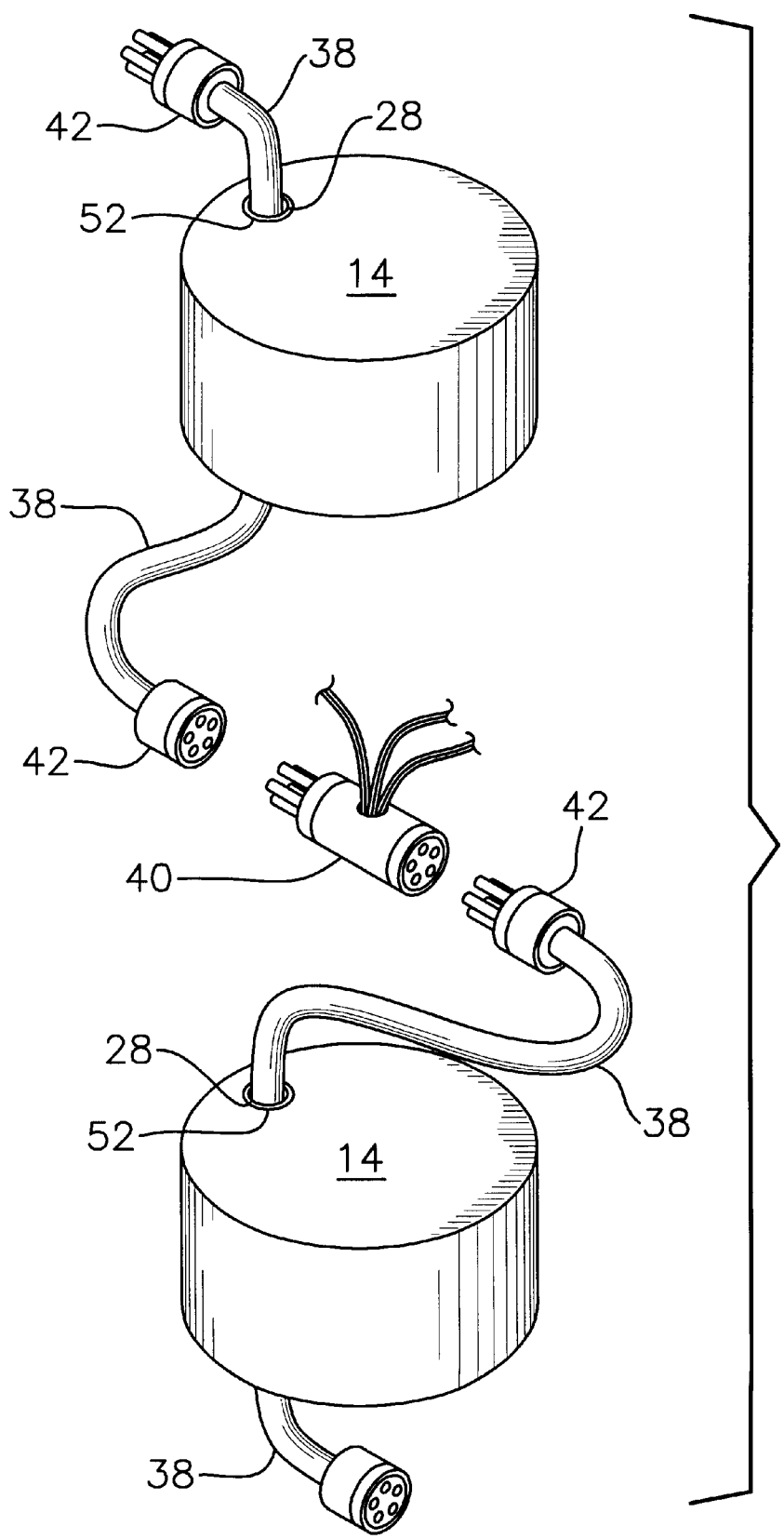
FIG. 5 is an expanded view of the cabling connection between plugs of a first housing segment.

Referring to FIGS. 3 and 5, the electrical cables 38 include electrical cable connector means 42 for ease in connecting the electrical portion of the system 10 within the elongate columnar housing assembly. Electrical cable junction fitting 40 is typically used within each first housing segment 12 as depicted in FIGS. 3 and 5.

The system 10 for monitoring environmental conditions inside a granulated pile 46 further preferably includes processor means 50 for correlating, profiling and analyzing data 36 corresponding to the environmental conditions 60 monitored within the pile 46 at each first housing segment 12 location. In a preferred practical application of the present invention, a computer is connected to the system wherein it is programmed to profile the field data over time. In a typical analysis using the present invention, the analyzed field data 36 is compared to the ambient environmental conditions in the area surrounding the pile 46. A probe or multiple probes can be used in the area surrounding the pile 46 and the ambient environmental values can be monitored separately and manually compared to the system 10 data 36. The data 36 can also be profiled into the processor means 50 wherein the processor means 50 is programmed to compare the data 36 with the ambient environmental conditions surrounding the pile 46.

The columnar system 10 is preferably capped with capping means 54 such as PVC caps on each end of the assembled system 10. The system 10 can also be made from other non-corrosive materials although PVC is preferred.

As depicted in FIGS. 1 and 3, access means 16 may be structurally provided with a door 20 which is hinged at 24 to the first housing segment 12. An alternative method is the use of channels 22 wherein the door 20 slides within the channels 22. Another alternative (not shown) is using a PVC repair collar as door 20 wherein door 20 essentially wraps around a portion of the first housing segment 12. At least two channel portions 22 are cemented about 180° apart on segment 12 at one or preferably both ends of the door 20; or an approximate ½ inch slice from a 4 inch PVC coupler can be used as a stop for door 20 by cementing the stop at one or preferably both ends of the door 20.

Figure 6:
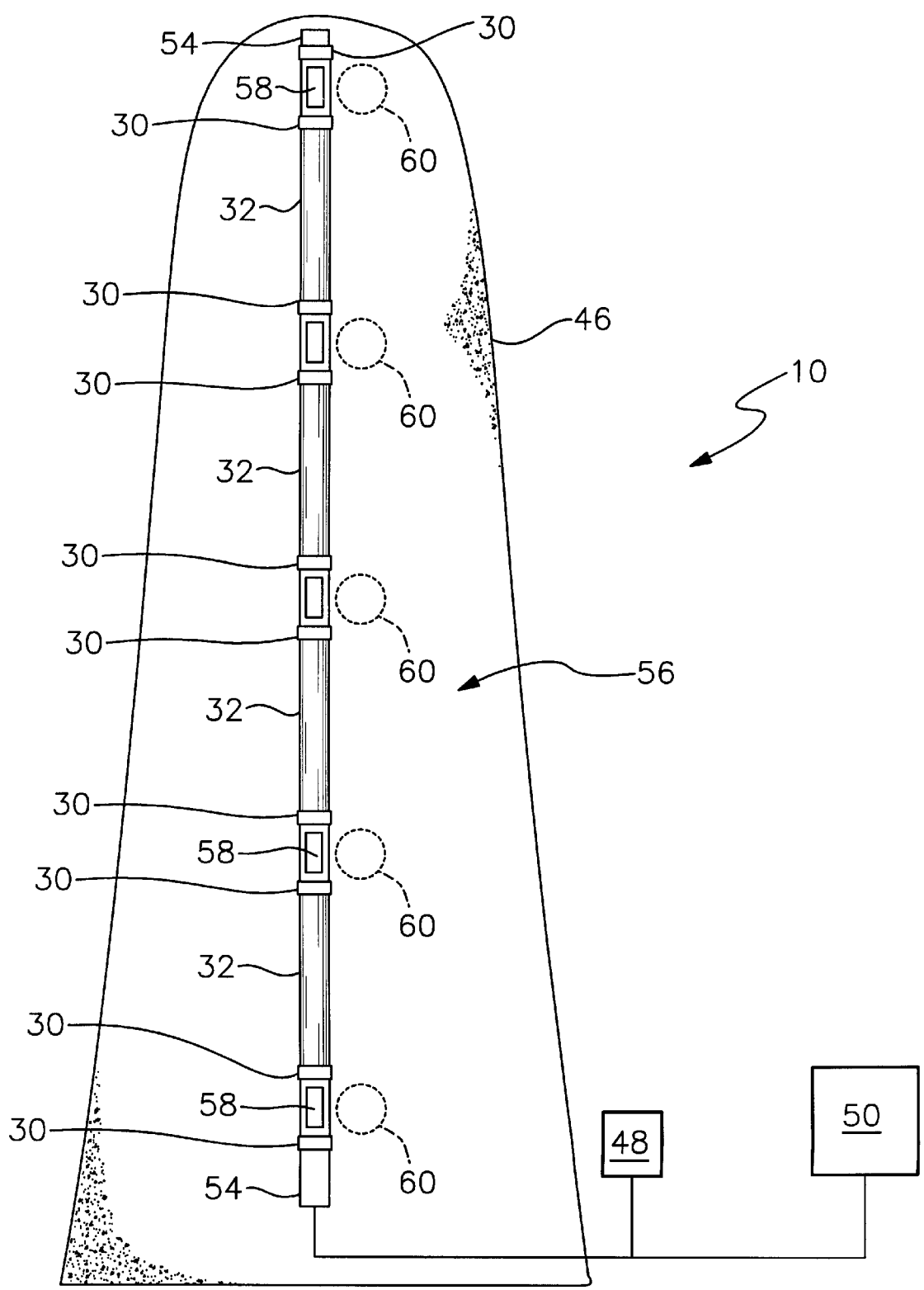
FIG. 6 is a schematic view of the invention oriented vertically inside a pile with the remote display and processor means.
Figure 7:
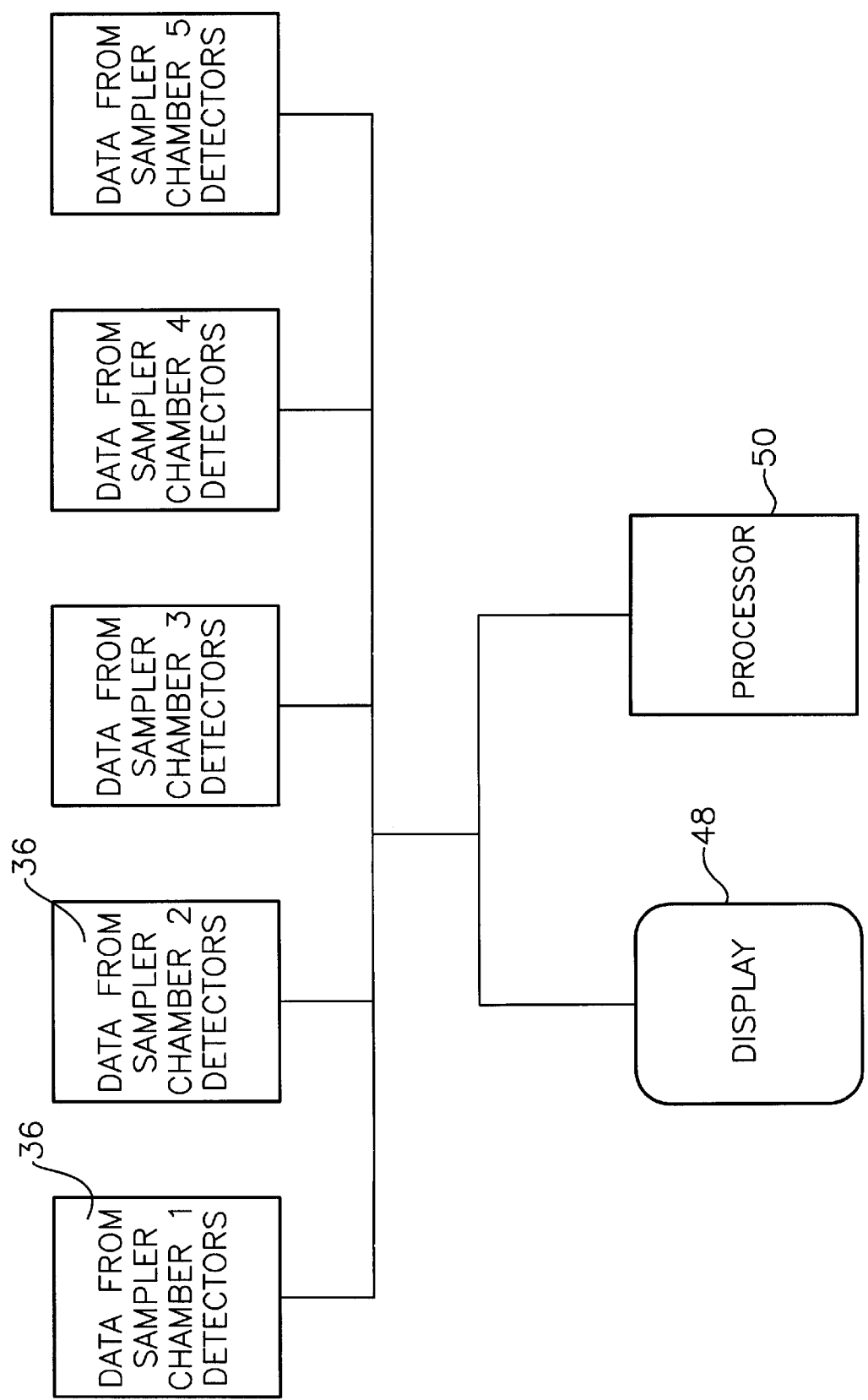
FIG. 7 is a schematic diagram of the data processing portion of the invention.

As depicted in FIGS. 6 and 7, the assembled columnar portion of the system 10 is typically inserted within a pile 46 and the display means 48 and processor means 50 are remotely located from the pile 46 and connected to each detecting means 34 in each first housing segment 12 with cable lines 38.

The assembled elongate columnar housing 56 of system 10 is placed in a predetermined orientation within the pile 46 such that the columnar housing assembly 56 is submerged in the granulated pile 46. While the pile is aging, an operator can remotely display the environmental conditions within the pile at the location 60 adjacent each first housing segment 12 by reading data 36 corresponding to the environmental condition 58 within the first housing segment 12. This data 36 should accurately represent the environmental conditions adjacent the first housing segment 12 due to the open communication from slits 26. Operators can also correlate environmental conditions within the pile 60 with the aging of the pile 46 until the pile 46 reaches grade. Processor means 50 is used to evaluate and analyze the data 36 from each of the first housing segments 12.

Figure 8:
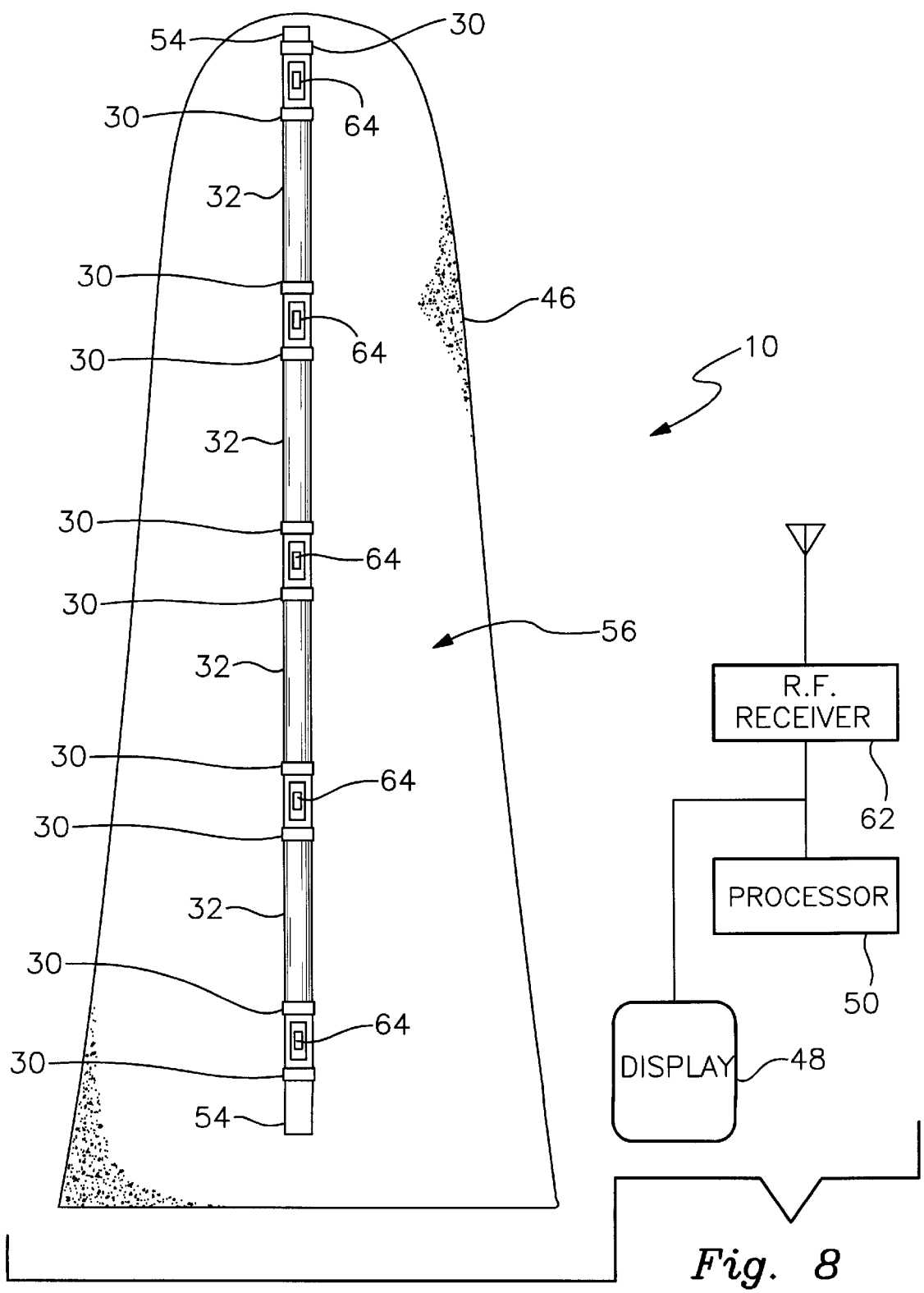
FIG. 8 is a schematic view of the invention oriented vertically inside a pile with the remote display and processor means, using radio frequency transmitting detectors in lieu of interconnecting cables.
Figure 9:
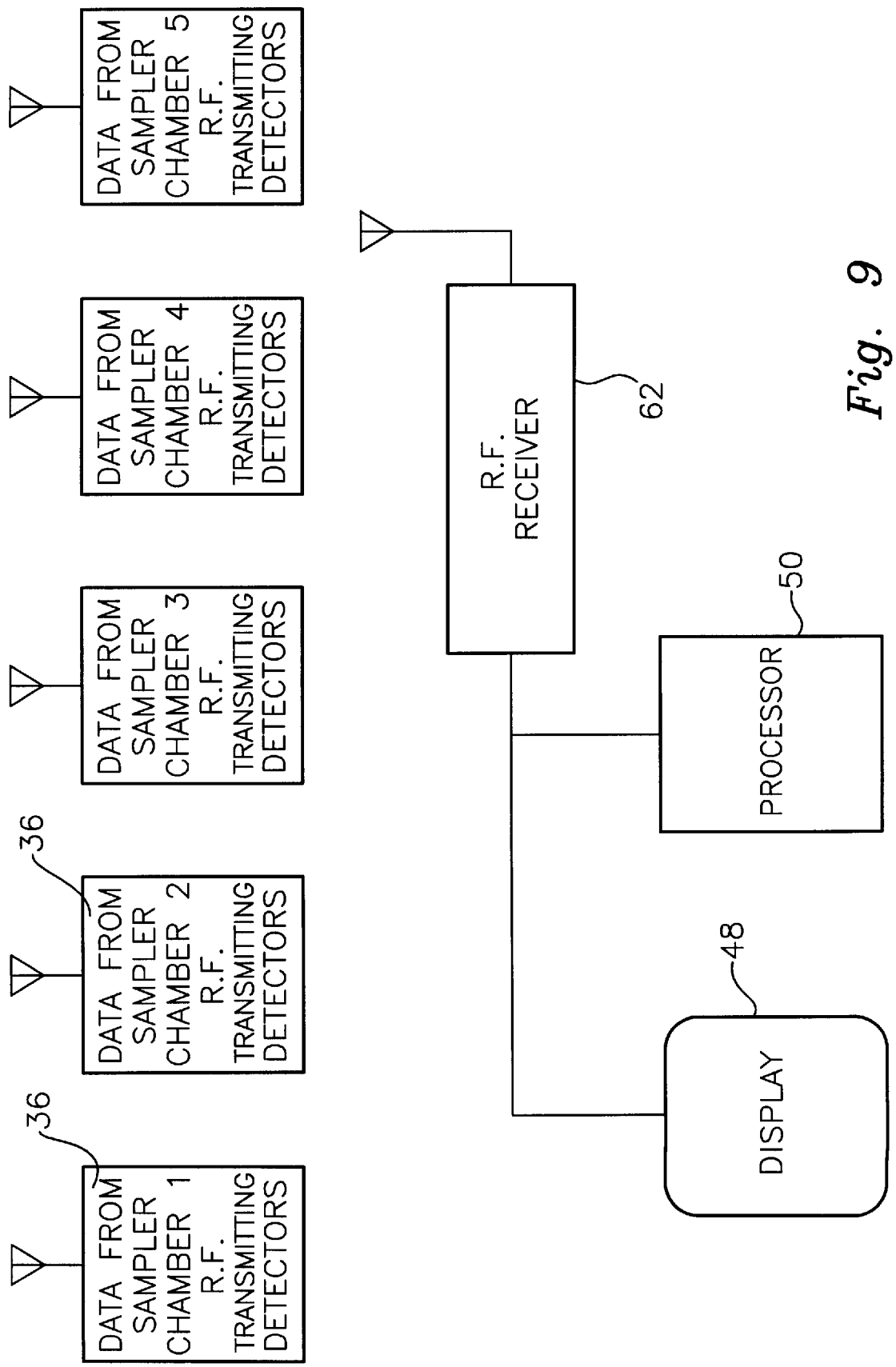
FIG. 9 is schematic diagram of the data processing portion of the invention using radio frequency transmitting detectors.

Another alternative embodiment is depicted in FIGS. 8–9, wherein instead of interconnecting the detectors 34 with the display 48 and processor means 50 using electrical cables 38, the detectors 34 are radio frequency transmitting detectors 64 which transmit data 36 to a receiver 62 which is interconnected to the display 48 and processor means 50.

The present invention also includes methods using the aforementioned system 10 and its various embodiments wherein the system is provided and placed as described above in a predetermined orientation inside the pile 46. The environmental conditions are then remotely displayed and correlated with the aging of the pile 46 until it reaches grade.

As seen from the foregoing description, the present invention satisfies a long felt need to provide a system and method for monitoring the aging of granulated piles in the field, thereby providing valuable cost and production savings in the granulated fertilizer industry.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A system for monitoring environmental conditions at locations inside a pile of granulated material at production and storage sites, comprising:

a plurality of ambient environmental condition detecting means;

an elongate columnar housing including a plurality of hollow first housing segments for inserting each of said ambient environmental condition detecting means and a plurality of second housing segments, each intermediate each of said first housing segments for spacing each first housing segment a predetermined spaced apart distance from each other;

the first housing segments having means for open communication between an interior ambient environmental condition in each first housing segments and a pile environmental condition at a predetermined location within the pile wherein the ambient environmental condition detecting means within each first housing segment detects said pile environmental condition adjacent said first housing segment;

means for remotely displaying and monitoring the environmental conditions detected within each first housing segment; and means for electrically interconnecting each detecting means within the first housing segments and the display means, wherein the system monitors the environmental condition at each predetermined location within the pile adjacent each first housing segment.

2. A system for monitoring environmental conditions at locations inside a pile of granulated material at production and storage sites according to claim 1 further comprising processor means for correlating data corresponding to the environmental conditions monitored within the pile adjacent each first housing segment with the aging of the pile.

3. A system for monitoring environmental conditions at locations inside a pile of granulated material at production and storage sites according to claim 1 wherein the means for open communication between the interior ambient environmental condition of each first housing segment and the pile environmental condition at the predetermined location in the pile adjacent each first housing segment comprises at least one column of a plurality of horizontal elongate slits, each of the plurality of slits being in a predetermined length and distance apart and the column generally extending between opposing ends of each first housing segment.

4. A system for monitoring environmental conditions at locations inside a pile of granulated material at production and storage sites comprising:

a plurality of ambient environmental condition detecting means, the detecting means further including radio frequency transmitting means for transmitting data corresponding to the environmental condition detected;

an elongate columnar housing including a plurality of first housing segments for inserting each of said ambient environmental condition detecting means and a plurality of second housing segments, each intermediate each of said first housing segments for spacing each first housing segment a predetermined spaced apart distance from each other;

the first housing segments having means for open communication between a hollow interior ambient environmental condition in each first housing segments and a pile environmental condition at a predetermined location within the pile wherein the ambient environmental condition detecting means within each first housing segment detects said pile environmental condition adjacent said first housing segment;

radio frequency receiver means for receiving data transmitted from each detecting means within the first housing segments; and means for remotely displaying and monitoring the environmental conditions detected within each first housing segment and received in the form of said transmitted data through said receiver means, wherein the system monitors the environmental condition at each predetermined location within the pile adjacent each first housing segment.

5. A system for monitoring environmental conditions at locations inside a pile of granulated material at production and storage sites according to claim 4 further comprising processor means for correlating data corresponding to the environmental conditions monitored within the pile adjacent each first housing segment with the aging of the pile.

6. A system for monitoring environmental conditions at locations inside a pile of granulated material at production and storage sites according to claim 4 wherein the means for open communication between the hollow interior ambient environmental condition of each first housing segment and the pile environmental condition at the predetermined location in the pile adjacent each first housing segment comprises at least one column of a plurality of horizontal elongate slits, each of the plurality of slits being in a predetermined length and distance apart and the column generally extending between opposing ends of each first housing segment.

7. A system for monitoring environmental conditions at locations inside a pile of granulated material at production and storage sites comprising:

a plurality of ambient environmental condition detecting means;

a plurality of hollow elongate columnar first housing segments, each first housing segment having plugged opposing ends and access means for inserting each of said ambient environmental condition detecting means within each first housing segment;

each first housing segment having means for open communication between a hollow interior ambient environmental condition of each first housing segment and a pile environmental condition at a predetermined location within the pile wherein the ambient environmental condition detecting means within the first housing segment detects said pile environmental condition adjacent said first housing segment;

a plurality of elongate columnar second housing segments, each second housing segment being a predetermined length and adapted for interconnecting each first housing segment;

means for remotely displaying the ambient environmental condition in each first housing segment; and means for electrically interconnecting each detecting means within each first housing segment and the display means, wherein the system monitors the environmental condition at each predetermined location within the pile adjacent each first housing segment.

8. A system for monitoring environmental conditions at locations inside a pile of granulated material at production and storage sites according to claim 7 wherein the access means is adapted to be opened for inserting and connecting the detecting means and closed for use in the pile.

9. A system for monitoring environmental conditions at locations inside a pile of granulated material at production and storage sites according to claim 7 wherein the means for open communication between the hollow interior ambient environmental condition of the first housing segment and the pile environmental condition at the predetermined location in the pile adjacent the first housing segment comprises at least one column of a plurality of horizontal elongate slits, each of the plurality of slits being in a predetermined length and distance apart and the column generally extending between opposing ends of each elongate first housing segment.

10. A system for monitoring environmental conditions at locations inside a pile of granulated material at production and storage sites according to claim 9 wherein each first housing segment has two columns of a plurality of horizontal elongate slits, each column being radially spaced a predetermined angle apart.

11. A system for monitoring environmental conditions at locations inside a pile of granulated material at production and storage sites according to claim 7 further including processor means for correlating data corresponding to the environmental conditions monitored within the pile at each first housing segment location with the aging of the pile.

12. A system for monitoring environmental conditions at locations inside a pile of granulated material at production and storage sites comprising:

a plurality of ambient environmental condition detecting means, the detector means further including radio frequency transmitting means for transmitting data corresponding to the environmental condition detected;

a plurality of hollow elongate columnar first housing segments, each first housing segment having plugged opposing ends and access means for inserting each of said ambient environmental condition detecting means within each first housing segment;

each first housing segment having means for open communication between a hollow interior ambient environmental condition of each first housing segment and a pile environmental condition at a predetermined location within the pile wherein the ambient environmental condition detecting means within the first housing segment detects said pile environmental condition adjacent said first housing segment;

a plurality of elongate columnar second housing segments, each second housing segment being a predetermined length and adapted for interconnecting each first housing segment;

radio frequency receiver means for receiving data transmitted from each detecting means; and means for remotely displaying the ambient environmental condition detected in each first housing segment and received in the form of said transmitted data through said receiver means, wherein the system monitors the environmental condition at each predetermined location within the pile adjacent each first housing segment.

13. A system for monitoring environmental conditions at locations inside a pile of granulated material at production and storage sites according to claim 12 wherein the access means is adapted to be opened for inserting and connecting the detecting means and closed for use in the pile of granulated material.

14. A system for monitoring environmental conditions at locations inside a pile of granulated material at production and storage sites according to claim 12 wherein the means for open communication between the hollow interior ambient environmental condition of the first housing segment and the pile environmental condition at the predetermined location in the pile adjacent the first housing segment comprises at least one column of a plurality of horizontal elongate slits, each of the plurality of slits being in a predetermined length and distance apart and the column generally extending between opposing ends of each elongate first housing segment.

15. A system for monitoring environmental conditions at locations inside a pile of granulated material at production and storage sites according to claim 14 wherein each first housing segment has two columns of a plurality of horizontal elongate slits, each column being radially spaced a predetermined angle apart.

16. A system for monitoring environmental conditions at locations inside a pile of granulated material at production and storage sites according to claim 12 further including processor means for correlating data corresponding to the environmental conditions monitored within the pile at each first housing segment location with the aging of the pile.

17. A system for monitoring environmental conditions inside a pile of granulated material at production and storage sites comprising:
   a plurality of hollow elongate columnar first housing segments;
   each first housing segment being adapted to house means for detecting environmental conditions inside said first housing segment;
   each first housing segment having means to plug opposing open ends of each first housing segment;
   each plug means having means for running electrical cable lines for the means for detecting environmental conditions through the system;
   each first housing segment having at least one column of a plurality of horizontal elongate slits for open communication of an environmental condition in the pile adjacent a first housing segment location within the pile, each of the plurality of slits being a predetermined length and distance apart and the column generally extending between opposing ends of each elongate columnar first housing segment;
   each first housing segment further including access means for inserting and electrically connecting the means for detecting environmental conditions inside said first housing segment, the access means being adapted to be opened for inserting and connecting the detecting means and to be closed for use in the pile;
   a plurality of hollow elongate second housing segments, each second housing segment being a predetermined length and adapted for interconnecting each elongate columnar first housing segment and for electrically interconnecting the electrical cable lines between each first housing segment; and
   means for remotely displaying the environmental conditions inside each first housing segment, the electrical cable lines from each means for detecting environmental conditions being connected to said display means, wherein the system monitors the environmental conditions within the pile at each first housing segment location while the pile is aging.

18. A system for monitoring environmental conditions inside a pile of granulated material at production and storage sites according to claim 17 wherein each first housing segment has two columns of a plurality of horizontal elongate slits, each column being radially spaced a predetermined angle apart.

19. A system for monitoring environmental conditions inside a pile of granulated material at production and storage sites according to claim 17 further including processor means for correlating data corresponding to the environmental conditions monitored within the pile at each first housing segment location with the aging of the pile.

20. A method for monitoring environmental conditions at locations inside a pile of granulated material at production and storage sites comprising the steps of:
   (a) providing an elongate columnar housing comprising a plurality of ambient environmental condition detecting means, a plurality of hollow first housing segments with plugged ends for inserting each of said ambient environmental condition detecting means and a plurality of second housing segments, each intermediate each of said first housing segments for spacing each first housing segment a predetermined spaced apart distance from each other, the first housing segments having means for open communication between an interior ambient environmental condition in each first housing segments and a pile environmental condition at a predetermined location within the pile wherein the ambient environmental condition detecting means within each first housing segment detects said pile environmental condition adjacent said first housing segment, the means for open communication between the interior ambient environmental condition of each first housing segment and the pile environmental condition at the predetermined location in the pile adjacent each first housing segment comprising at least one column of a plurality of horizontal elongate slits, each of the plurality of slits being in a predetermined length and distance apart and the column generally extending between opposing ends of each first housing segment, means for remotely displaying and monitoring the environmental conditions detected within each first housing segment, processor means for correlating data corresponding to the environmental conditions monitored within the pile adjacent each first housing segment with the aging of the pile until the pile reaches grade, and means for electrically interconnecting each detecting means within the first housing segments and the display means and processor means;
   (b) placing said elongate columnar housing in a predetermined orientation such that the housing is submerged in the pile of granulated material;
   (c) remotely displaying the environmental conditions within the pile adjacent each first housing segment; and
   (d) correlating environmental conditions within the pile with the aging of the pile until the pile reaches grade.

21. A method for monitoring environmental conditions at locations inside a pile of granulated material at production and storage sites comprising the steps of:
   (a) providing an elongate columnar housing comprising a plurality of ambient environmental condition detecting means, the detecting means further including radio frequency transmitting means for transmitting data corresponding to the environmental condition detected, a plurality of hollow first housing segments with plugged ends for inserting each of said ambient environmental condition detecting means and a plurality of second housing segments, each intermediate each of said first housing segments for spacing each first housing segment a predetermined spaced apart distance from each other, the first housing segments having means for open communication between an interior ambient environmental condition in each first housing segments and a pile environmental condition at a predetermined location within the pile wherein the ambient environmental condition detecting means within each first housing segment detects said pile environmental condition adjacent said first housing segment, the means for open communication between the interior ambient environmental condition of each first housing segment and the pile environmental condition at the predetermined location in the pile adjacent each first housing segment comprising at least one column of a plurality of horizontal elongate slits, each of the plurality of slits being in a predetermined length and distance apart and the column generally extending between opposing ends of each first housing segment, radio frequency receiver means for receiving data transmitted from each detecting means within the first housing segments, means for remotely displaying and monitoring the environmental conditions detected within each first housing segment and received in the form of said transmitted data through said receiver means, and processor means for correlating data corresponding to the environmental conditions monitored within the pile adjacent each first housing segment with the aging of the pile until the pile reaches grade;

(b) placing said elongate columnar housing in a predetermined orientation such that the housing is submerged in the pile of granulated material;

(c) remotely displaying the environmental conditions within the pile adjacent each first housing segment; and (d) correlating environmental conditions within the pile with the aging of the pile until the pile reaches grade.

* * * * *